(12) United States Patent
Lentini et al.

(10) Patent No.: US 7,290,061 B2
(45) Date of Patent: Oct. 30, 2007

(54) SYSTEM AND METHOD FOR INTERNET CONTENT COLLABORATION

(75) Inventors: Russell P. Lentini, San Jose, CA (US); Goutham P. Rao, San Jose, CA (US); Jon N. Thies, San Jose, CA (US); Murli Thirumale, San Jose, CA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 845 days.

(21) Appl. No.: 10/016,689

(22) Filed: Dec. 5, 2001

(65) Prior Publication Data

US 2002/0091835 A1 Jul. 11, 2002

Related U.S. Application Data

(60) Provisional application No. 60/254,351, filed on Dec. 5, 2000, provisional application No. 60/254,527, filed on Dec. 5, 2000.

(51) Int. Cl.
*G06F 15/16* (2006.01)

(52) U.S. Cl. ........................ 709/246; 709/227

(58) Field of Classification Search ................ 709/246, 709/217, 205, 227–228, 204; 715/523, 513
See application file for complete search history.

(56) References Cited

U.S. PATENT DOCUMENTS

| | | | | |
|---|---|---|---|---|
| 5,924,116 A * | 7/1999 | Aggarwal et al. | ........... | 711/122 |
| 6,298,356 B1 * | 10/2001 | Jawahar et al. | ............. | 707/201 |
| 6,317,795 B1 * | 11/2001 | Malkin et al. | ............... | 709/246 |
| 6,356,902 B1 * | 3/2002 | Tan et al. | ...................... | 707/10 |
| 6,421,714 B1 * | 7/2002 | Rai et al. | .................... | 709/217 |
| 6,438,576 B1 * | 8/2002 | Huang et al. | ................ | 709/202 |
| 6,507,865 B1 * | 1/2003 | Hanson et al. | ............ | 705/36 R |
| 6,535,896 B2 * | 3/2003 | Britton et al. | ............... | 715/523 |
| 6,564,251 B2 * | 5/2003 | Katariya et al. | ............. | 709/214 |
| 6,567,848 B1 * | 5/2003 | Kusuda et al. | .............. | 709/219 |
| 6,635,089 B1 * | 10/2003 | Burkett et al. | .............. | 715/513 |
| 6,701,376 B1 * | 3/2004 | Haverstock et al. | ........ | 709/246 |
| 6,718,516 B1 * | 4/2004 | Claussen et al. | ............ | 715/513 |

(Continued)

*Primary Examiner*—Ario Etienne
*Assistant Examiner*—Hussein El-chanti
(74) *Attorney, Agent, or Firm*—Choate Hall & Stewart LLP; John D. Lanza

(57) ABSTRACT

A system for collaborative exchange of Web based content information between and among disparate and unrelated content sources includes a content server, and a server appliance, electronically disposed between the content server and a network which terminates HTTP sessions directed to the content server and initiates a HTTP session with the content server as a proxy. A content collaboration engine, hosted on the server appliance, suitably includes a content recognition engine which receives content from the server, converts received content to DOM, and classifies content in accordance with XML recognition rules. A content mapping engine extracts content definition fields from classified content and requests related content from collaborating sites, the requested content having content definition fields including values substantially the same as the extracted content definition fields. A content category structure defines the format for categorizing all content sources collaborating in the exchange of content within a consortium. A request for information protocol defines a format for identifying valid content fields a content provider can be queried against in order to identify and recover content from a specific category categorized by the content category structure definition. The content category structure also identifies members of the consortium against which queries may be directed.

21 Claims, 9 Drawing Sheets

U.S. PATENT DOCUMENTS

| | | | |
|---|---|---|---|
| 6,732,145 B1 * | 5/2004 | Aravamudan et al. | 709/204 |
| 6,732,148 B1 * | 5/2004 | Estrada et al. | 709/205 |
| 6,735,586 B2 * | 5/2004 | Timmons | 707/3 |
| 6,748,450 B1 * | 6/2004 | Dutta | 709/246 |
| 6,772,413 B2 * | 8/2004 | Kuznetsov | 717/136 |
| 6,823,373 B1 * | 11/2004 | Pancha et al. | 709/219 |
| 6,865,599 B2 * | 3/2005 | Zhang | 709/218 |
| 6,952,717 B1 * | 10/2005 | Monchilovich et al. | 709/205 |
| 2003/0187956 A1 * | 10/2003 | Belt et al. | 709/219 |
| 2003/0212610 A1 * | 11/2003 | Duffy et al. | 705/26 |
| 2004/0210556 A1 * | 10/2004 | Brooke et al. | 707/1 |
| 2005/0210145 A1 * | 9/2005 | Kim et al. | 709/231 |
| 2006/0021020 A1 * | 1/2006 | Coley et al. | 726/11 |

* cited by examiner

```
<CATname="ccs"
    <CAT name="arts"
        <cat name="music"
            <cat name="concerts"
                <STR field="performer,
                <IMPurl="rt//www.ticketmaster.co
                <IMPurl="rt///www.concerts.com
            </CAT
        </CAT
    </CAT
    <CAT
    </CAT
    <CAT name="recreation"
    </CAT
    <CAT         ping"
        <CAT name="entertainment"
            <CAT name="recordings"
                <SYN word="CD" list="compact
                <STR field="artist, album,
                <IMPurl="rt//www.cdnow.com
                <IMPurl="rt//www.amazon.com
                <IMPurl="rt//www.half.com"
            </CAT
        </CAT
    </CAT
</CAT
```

*FIG.1*

```
<!-- Copyright (C) 2000 WebUnwired www.WebUnwired.com -->
<!-- CCS.dtd -->

<!-- The Category tag can contain RFI structure definitions, Synonym -->
<!-- tables and URLs pointing to content providers implementing this -->
<!-- category. Each category must list a name and an ID field. -->
<!ELEMENT CAT ((STR?), (CAT, SYN, IMP)*)>
<!ATTLIST CAT name CDATA #REQUIRED id CDATA #REQUIRED>

<!-- The STR tag defines the relational schema for a category. The -->
<!-- only supported data type is string and the field names are to -->
<!-- be listed as a comma separated list. -->
<!ELEMENT STR>
<!ATTLIST STR field CDATA #REQUIRED>

<!-- The IMP tag specifies the URL of the content provider that -->
<!-- implements this category. A category may list more than one -->
<!-- content sources as implementers of this category. -->
<!ELEMENT IMP>
<!ATTLIST IMP url CDATA #REQUIRED>

<!-- If a category contains a SYN tag, then an RFI query executed -->
<!-- against this category that uses the 'like' clause will use -->
<!-- synonyms listed here for it's matching algorithm. -->
<!ELEMENT SYN>
<!ATTLIST SYN word CDATA #REQUIRED list CDATA #REQUIRED>
```

*FIG. 2*

```
<?xml version='1.0'encoding='us-ascii'?>
<!-- Copyright (C) 2000 WebUnwired www.WebUnwired.com -->
<!-- RESULTS.dtd -->

<!-- Top level tag...all results are contained with in a RESULTS tag. -->
<!-- A results tag can contain 0 or many SET tags, which actually contain -->
<1-- the results. -->
<!ELEMENT RESULTS (SET)*)>
<!ATTLIST RESULTS query CDATA #REQUIRED>

<!-- The SET tag actually encapsulates the results. It must contain the -->
<!-- schema for the category for which the results are valid, identify -->
<!-- the schema itself, contain a unique set number, and finally 0 or 1 -->
<!-- results tag which points to the URL of the resulting content page. -->
<!ELEMENT SET (FIELD*, RESULT?)>
<!ATTLIST STR cat CDATA #REQUIRED id CDATA #REQUIRED>

<!-- The field tag identifies a field in the schema corresponding to the -->
<!-- category against which the query was executed. It must identify -->
<!-- a value for the field or nothing if the field is not implemented. -->
<!-- Typically there wil be more than one field per category. -->
<!ELEMENT FIELD (#PCDATA)>
<!ATTLIST FIELD name CDATA #REQUIRED>

<!-- If the results tag is included with in a results set, then it -->
<!-- identifies a URL pointing to a content page where the results -->
<!-- this resulting row of the query is available. -->
<!ELEMENT RESULT>
<!ATTLIST RESULT url CDATA #REQUIRED>
```

*Fig. 3*

```
<RESULTS query="eslect* from ticketmaster.com:arts.music.concerts where artist='x'>
    <SET cat="1" id="1">
        <FIELD name="artist">X</FIELD>
        <FIELD name="location">San Jose</FIELD>
        <RESULT url="http://www.ticketmaster.com/aaabbbccc"/>
    </SET>
    <SET cat="1" id="2">
        <FIELD name="artist">X</FIELD>
        <FIELD name="location">New York</FIELD>
        <RESULT url="http://www.ticketmaster.com/111222333"/>
    </SET>
</RESULTS>
```

*Fig. 4*

SYSTEM AND METHOD FOR INTERNET CONTENT COLLABORATION

CROSS REFERENCE TO RELATED APPLICATIONS

The present application is related to and takes priority from provisional patent applications Ser. Nos. 60/254,351 and 60/254,527, both filed Dec. 5, 2000, entitled SYSTEM FOR INTERNET CONTENT COLLABORATION and SYSTEM AND METHOD FOR PROVIDING AUTOMATED SESSION MANAGEMENT AND AUTOMATED CONTENT NAVIGATION USING PROXY URLs, commonly owned by the assignee of the present invention, the entire contents of which are expressly incorporated herein by reference.

FIELD OF THE INVENTION

The present invention is directed to Internet content collaboration methodologies and, more particularly, to systems and methods for the exchange of collaborative information from various related content sources.

BACKGROUND OF THE INVENTION

Computer users are increasingly finding navigating document collections to be difficult because of the increasing size of such collections. For example, the World Wide Web on the Internet includes millions of individual pages all dealing with varied content. Moreover, large companies' internal Intranets often includes repositories filled with many thousands of documents, i.e., an example of "local" content.

It is frequently true that documents (content) on the Web and in local content repositories are not very well indexed. Consequently, finding desired information in such a large collection, unless the identity, location, or characteristics of a specific document are well known, can be much like looking for a needle in a haystack.

The World Wide Web is a loosely interlinked collection of documents (mostly text and images, collectively known as content) located on servers distributed over the Internet. Generally speaking, each document has an address, or Uniform Resource Locator (URL), in the exemplary form "http://www.server.net/directory/file.html." In that notation, the "http:" specifies the protocol by which the document is to be delivered, in this case the "Hypertext Transport Protocol." The "www.server.net" specifies the name of a computer, or server, on which the document resides; "directory" refers to a directory or folder on the server in which the document resides; and "file.html" specifies the name of the file.

Most documents on the Web are in HTML (Hypertext Markup Language) format, which allows for formatting to be applied to the document, external content (such as images and other multimedia types) to be introduced within the document, and "hotlinks" or "links" to other documents to be placed within the document, among other things. Although this provides some capability of embedding one form of information into another, hotlinking is a static process that does not involve content collaboration in any significant degree.

In particular, content collaboration might be thought of as a resource pool that contains a collection of information that all relates to the same subject or might be defined as belonging to a particular interest category. All of the various locations of concerts being given by a popular musical group such as Pink Floyd might be representative of such a resource pool. Conventional web pages might contain information about a single concert location, i.e., a New York concert, but might not be able to give a user full information on all concert locations throughout the world.

Additionally, content specific web pages that might present a listing of certain restaurants in a particular geographic locale are often incomplete in many respects, since they are a collection established and maintained by a particular content source. A user is therefore limited only to the restaurants collected by that particular content source. Since content sources typically represent information belonging to the same category (such as music or restaurants, for example) using different content formats, it is extremely difficult for content sources to exchange collaborative information. For example, when a user desires to find information on the Internet (or other large network) the user will frequently turn to a "search engine" to locate the information.

The real utility in the search engine will be understood when it is realized that the Web is much like an extremely large library, in that there are literally millions of information objects in existence, and if one knows the URL, one is able to access them. Since the Web has multiple listings of books, movies, restaurants, and the like, the number of things that a user is able to lookup, typically includes all of the contents of a library, in addition to the contents of a video store and might even be extended to include the contents of a typical Yellow Pages.

The difficulty with finding information on the Web is that very little of the information contained therein is referenced to metadata. Accordingly, most searching is done using brut-source techniques, conventionally supplied by various Web Robots of search engines such as AltaVista, Infoseek and Excite. Cites of this type perform the equivalent of reading every book in a library and allowing a user to look things up based on the words in the text. Not surprisingly, Web search results are often poorly presented and have very little relation to what a user was searching for. Additionally, search results are only presented on a page-by-page or object-by-object basis. With the exception of embedded links, and the like, similar material from disparate cites have never been collected and presented in a single document.

Those who have considered these issues generally agree that the Web urgently requires metadata as a means of simplifying information search and recover procedures. Given universal metadata, a set of lookup fields, such as author, title, date, subject and the like, might be appended to all forms of textual information such that information relating to a given author, for example, might be easily extracted. Additionally, search engine details, such as how a Web cite might package and interchange metadata would also need to be standardized or unified, such that all metadata using facilities would be simply and easily accessible regardless of minor perturbations in structure, form and format.

Accordingly, there is a need for both systems and methodologies by which a unitary set of lookup keys, values and software may be developed such that there exists some form of organizing directorate for content.

SUMMARY OF THE INVENTION

In one aspect of the invention, a system for collaborative exchange of Web based content information between and among disparate and unrelated content sources comprises a content server, disposed at a facility, the facility belonging to a particular content provider, the provider providing content through the web server. A server appliance, electronically disposed between the web server and a wide area communication network, terminates a HTTP session directed to the web server and initiates a HTTP session with the web server as a proxy. A content collaboration engine, hosted on the server appliance, suitably includes a content recognition engine, the recognition engine receiving content from the web server in response to the HTTP session initiated by the appliance, the recognition engine converting received content to DOM, the recognition engine further classifying content in accordance with XML recognition rules, and a content mapping engine, the mapping engine extracting content definition fields from classified content and requesting related content from collaborating sites, the requested content having content definition fields including values substantially the same as the extracted content definition fields.

In an additional aspect, the invention further comprises a content fusion engine, the fusion engine integrating related content received from collaborating sites with classified content, the fusion engine converting the fused content to a desired output format. In particular, the output format might consist of HTML, WML, XML, and PDF, or some other equivalent output format.

In a further aspect, the invention includes a network gateway, where the server appliance is interposed between the gateway and the content server, the appliance configured to appear as the gateway to the content server and as the content server to the gateway. Alternatively, the system comprises a network gateway and a network management agent, where the server appliance is coupled to the network management agent, the agent being configured to redirect HTTP requests made to the content server to the appliance.

In yet an additional aspect, the invention a consortium of content sources, a content category structure definition, and a request for information protocol, where the content category structure definition comprises a format for categorizing all content sources collaborating in the exchange of content within the consortium. The request for information protocol comprises a format for defining a structure that identifies valid content fields a content provider can be queried against in order to identify and recover content from a specific category categorized by the content category structure definition and further comprises means for requesting collaborative information from third party content sources.

Advantageously, in a system for exchanging Web based content information between and among disparate and unrelated content sources, the invention is characterized as a method for collaborative exchange of related content. The method comprises providing content through at least a web server, disposed at a facility, the facility belonging to a particular content provider, electronically disposing a server appliance between the web server and a wide area communication network, the appliance terminating a HTTP session directed to the web server and initiating a HTTP session with the web server as a substitute, and receiving content from the web server in response to the HTTP session initiated by the appliance. Once received, the content is converted to DOM and classified in accordance with XML recognition rules. Content definition fields are extracted from classified content and related content from collaborating sites is requested, the requested content having content definition fields including values substantially the same as the extracted content definition fields. Related content received from collaborating sites is integrated with classified content and the fused content is converted to a desired output format.

In a system for exchanging Web based content information between and among disparate and unrelated content sources, a particularly advantageous method for collaborative exchange of related content comprises establishing a consortium of content sources, defining a content category structure, and establishing a request for information protocol where the content category structure definition comprises a format for categorizing all content sources collaborating in the exchange of content within the consortium. The request for information protocol comprises a format for defining a structure that identifies valid content fields a content provider can be queried against in order to identify and recover content from a specific category categorized by the content category structure definition. The request for information protocol further comprises means for requesting collaborative information from third party content sources.

In a further aspect, the content category structure definition comprises category tags, the category tags identifying a particular category according to a pre-defined name indicia, and further comprises a structure tag, the structure tag identifying at least one structure field according to a pre-defined name indicia, the at least one structure field defining a valid field against which a content provider implementing a particular category may be queried against. The content category structure definition further includes synonym identification means for associating operative synonym terminology to a category name or structure field lexicography.

DESCRIPTION OF THE DRAWINGS

These and other features, aspects and advantages of the present invention will be more fully understood when considered with respect to the following specification, appended claims and accompanying drawings, wherein:

FIG. 1 is an exemplary embodiment of a content category structure, useful in practice of principals of the present invention;

FIG. 2 is an exemplary content category structure document type definition in accordance with the present invention;

FIG. 3 is an exemplary document type definition for a Request For Information Result Set, in accordance with the present invention;

FIG. 4 is an exemplary Request For Information Result Set, provided by practice of principals of the present invention;

DESCRIPTION OF THE INVENTION

Figure 5:
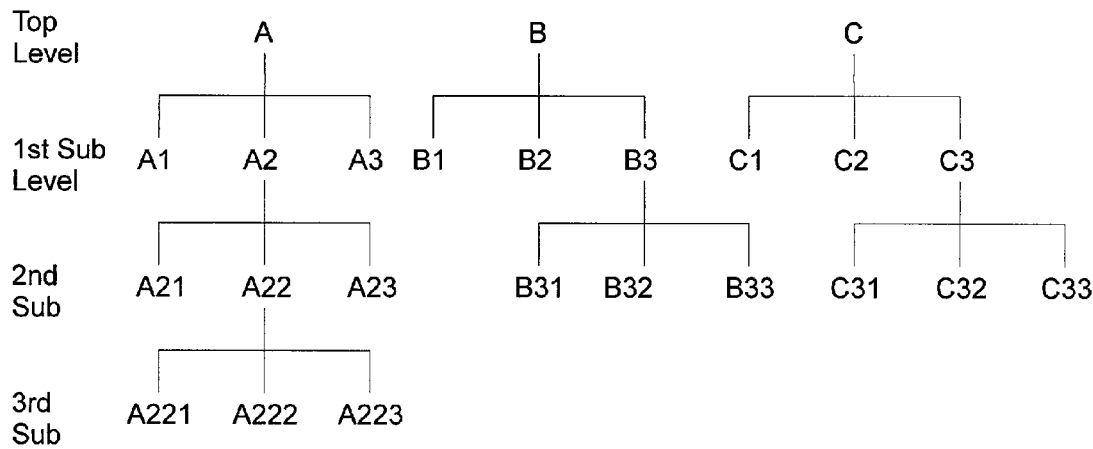
FIG. 5 is a semi-schematic, structure diagram of a hierarchical organization illustrating nodal divergence.

Briefly, the present invention is directed to a system and methodology for the exchange of collaborative information from various content sources and is concerned with valid category specification for collaborations and formatting of information exchange tokens within related content source categories. In particular, the present invention is directed to a methodology for mapping categorized content into a common pre-defined format in terms of Extended Markup Language (XML), such that related information collaboration occurs in the common pre-defined format. Specifically, a Content Category Structure (CCS) specifies the format for categorizing all content sources involved in information content collaboration and defines a structure that identifies valid fields a content provider can be queried against for content delivery from a specific category.

Prior to entering into a detailed description of the features and methodologies of the present invention, it will be useful to review somewhat the current structure of Internet information requests and exchanges. In particular, the Request For Information (RFI) protocol borrows concepts from fundamental relational database theory and Structured Queries Language (SQL). SQL allows users to access data in relational database management systems, such as Oracle, Sybase, Informix, Microsoft SQL Server, Access, and others, by allowing users to describe the data the user wishes to see in a particular form. SQL also allows users to define the data in a database, and manipulate that data. In summary, SQL is a database query language that was adapted as an industry standard in 1986.

RFI primarily views every web page (i.e., content) as a row in a relational table, where the schema for this table is described in one of several identified categories. Every web page is able to be classified as belonging to one or more defined categories and, when a web page fits into a particular category, it immediately becomes one row in a hypothetical relational table, whose schema is dictated by that category.

However, although it might be conceptually viewed as such in a particular content, a web page is not a table and often defies conventional tabular analysis. A web page is more correctly viewed as an unstructured mix of content and text which varies on a site-by-site basis and even on page-by-page basis within any one particular site. Accordingly, there needs to be some methodology by which a relational table may be dynamically created according to the category schema and the rows of the table populated with values from the current web page being processed. An RFI query engine, hosted at the content provider's site includes logic, residing at the content provider, that performs such real time translations. Given this logic, it is possible to perform standard relational queries across multiple content providers, resulting in collaborated content.

In particular, a Request For Information Protocol (RFIP) is a specification for the exchange of collaborative information from various content sources. The RFIP provides a mechanism by which two content sources are able to share related information. In the particular case where two independent content sources represent information belonging to the same category (such as music, restaurants, and the like) using different content formats, the RFIP maps these categories into a common pre-defined format, such that collaboration of related information occurs within this pre-defined format. The RFIP defines collaboration parameters and information exchange items in terms of Extended Markup Language (XML).

Accordingly, the RFI protocol is able to develop various types and forms of content related to a particular document being viewed, from various distributed (and perhaps, local) content sources. Valid categories for collaboration are outlined by the RFI protocol, as well as the token format of information exchanged within these categories. An application level protocol for requesting collaborative information, as well as rules for managing content collaboration partners (also termed RFI consortiums herein) are also specified by the RFI protocol.

Dynamic Internet content enhancement can be described as the process of modifying Internet content, seamlessly and on the fly, thereby enhancing the content in order to streamline a web user's experience. Typically, when a client process issues an HTTP request to a content provider, the request is intercepted by the novel system, which chooses the next action to take, depending on the request configuration. The system is able to modify the HTTP request as it is relayed back to the actual content server, or relay the HTTP request as is. In order to modify the HTTP reply, the system relies on XML configuration files, which define rules about how the system should enhance the content before the content is transmitted to the client device. These rules can be as simple as rearranging the HTML content, filtering certain portions of the content, translating the content from HTML to WML or Postscript, or the rules could direct a process as complex as fusing-in related content, from another content provider, into the content of the requested page or document.

With regard to fusing-in related content from other content providers, the system's configuration rules determine the creation of a packet structure termed a Request For Information (RFI) packet. An RFI packet might be suitably viewed as an XML structure that contains certain key statistical information regarding the nature of the client requesting a particular content page, the client device's electronic and/or display characteristics and the type of web page currently being processed.

In this regard, every web page being processed is classified in accordance with certain pre-defined categories. Each category contains a pre-defined RFI structure that indicates the most important information that is to be gathered from that type of web page. These categories are specified in XML and are termed herein as Content Category Structures (CCS). Depending on the type of web page, the RFI structure contains category specific details regarding the nature of that web page. For example, a web page about a music album might contain information regarding the commonly assumed identification characteristics of that album, such as the name of the artist and the name of the album. This forms the basic input needed to fetch related content from other content providers, where desired.

Once an RFI packet is constructed, the system executes an RFI query on the other content providers listed in the configuration file. System hosts, running at these external content provider facilities, contain an RFI query engine that fetches information which is related to the transmitted RFI packet from their associated site, and forward that information to the original system host that generated the RFI query. The original system host then integrates this additional captured content with the original HTML page requested and serves the composite (dynamically enhanced) document to the client. As described above, system hosts are also able to post-convert this HTML information to other document formats such as WML, PDF, or the like.

The RFI protocol defines certain procedures for exchanging collaborative information between and among various content sources. In particular, the RFI protocol defines a format for categorizing all of the content sources involved in the collaboration of information, i.e., the Content Category Structure or CCS. Further, the RFI protocol defines a format for identifying a structure that identifies valid fields a content provider can be queried against in order to recover content from a specific category. A procedure (an application protocol) to request collaborative information from other content sources (RFI queries) as well as a procedure to respond to RFI queries (RFI results) are also the subject of the RFI protocol. Further, the protocol is concerned with procedures for managing communities within which information can be exchanged and collaborated. These communities are also termed RFI consortiums.

Categories in the Content Category Structure are modeled after the World Wide Web Consortium (W3C) recommendation for the Resource Description Framework (RDF). However, the Content Category Structure format strictly implements a defined truncated version of the RDF framework.

The Resource Description Framework, as the name implies, is a framework for describing and exchanging metadata. Briefly described, metadata can be viewed as information about information, and is well understood by those having skill in the art. Typically, metadata is arranged in chunks, such as actors, artists, business category, that associate look up information, such as Sean Penn, Rembrandt, drycleaners, with the real information a user is seeking.

In the context of RDF, the framework for describing and exchanging metadata is built on a set of fairly particular rules. For example, a "resource" is any object that is able to have a URL; this includes the global collection of Web pages, as well as individual elements of an XML document, for example. A "property type" is a resource that has been given an identifying name and which can be used as a property, for example "author" or "title." A "property" is a combination of a resource, a property type and a value. An example of a property might be the director of "Straw Dogs" is Sam Peckinpah. In the context of the Internet, for example, a search for films by Sam Peckinpah might be directed to the URL http://www.blockbuster.com. The URL for Blockbuster is an example of a resource, while a search within the Blockbuster website would be for a property type such as author or title. Where Straw Dogs is represented as an html document, a property might be exemplified by "the director of http://www.blockbuster.com/strawdogs.html=sampeckinpah.

The general rules discussed above define the central concepts of RDF. However, a significant amount of abstract terminology and XML syntax is required to define these rules with sufficient precision that application software programs are able to process them adequately. In particular, transforming properties into resources is a fairly complex process and in situations where it is necessary to order properties, substantial amounts of syntax are required.

RDF can be understood as providing a model for metadata and a syntax such that independent parties are able to exchange metadata for useful purposes. What RDF does not provide, however, is any independent definition of property types. RDF does not define author, title, director, business category, or the like. In other words, RDF is not able to define categorical identifiers.

By way of contrast the Content Category Structure utilizes category identifiers, but no two categories within the CCS are explicitly related to each other. Relationships between the categories and the CCS are represented by way of explicit collaboration rules which are specified at each content site. In particular, the CCS provides categories for all web pages across various content sites. In a manner similar to how the Resource Definition Framework (RDF) categorizes the global collection of websites, the CCS provides categories for the global collection. Necessarily, any one particular web page may find itself defined under one or more CCS categories. It should be understood that the CCS therefore provides a high level category within which any website may reside and defines structure for representing information contained within that category. In accordance with the present invention, this categorical information structure is the primary valid format for representing key information stored in a web page.

In a manner quite similar to that represented by the DMOZ hierarchical categorical Internet information structure, the complete CCS provides a list of all content sites participating in what is termed a collaborating consortium, with each entry in the CCS list being carefully categorized such that the collection of consortium content sites are contained within a rationally related corresponding category or set of rationally related corresponding categories. Further, each categorical definition in the CCS list contains a definition of the valid format by which content information may be requested with request to that category.

As the term is used herein, a consortium is a community of content source providers that agree to share information between and among one another. Naturally, consortium members concerned with a particular category of content are able to define that contents' categorical hierarchical structure between and among themselves. By way of example, the Open Directory Project (ODP) is a well understood methodology for defining a structured classification or categorization system that is intended to model a global, hierarchical classification system. Given that hierarchical models may be generally characterized as "branching structures", with various levels and sub-levels being formed by rational branches radiating from a "next higher level node", with each of the sub-level branches perhaps terminating themselves with a "next level node" to thereby continue the branching structure.

As depicted in the simplified semi-schematic diagram of FIG. 5, a global, hierarchical classification or categorization model is divided vertically into a number of levels or sub-levels, with an increasing density of nodes occurring at each next progressive level (traveling downward through the diagram). The first level of such a structure is commonly termed the top level and suitably comprises the starting point for progression through the structure. In the exemplary embodiment of FIG. 5, the top level set of nodes are denoted by alpha characters A, B and C. It should be noted that the top level nodes A, B and C do not need to have any relationship with one another and, may indeed represent the starting point for completely disjoint and unrelated structures or categories. If one were to enter the exemplary hierarchical structure of FIG. 5, one might choose to enter at a top level node A, which might be the top level descriptor referring to a particular or specific body of information pertinent to the organization of that particular structure.

Upon entry at top level A, a user who traverses the structure might either be presented with a body of information specifically related to the A descriptor or, as is more likely, might be offered an additional set of choice vectors, represented by the more finely grained sub-category nodes, denoted in the exemplary diagram of FIG. 5 by nodes A2, A22 and A222. Each of these first "sub-level" nodes should be understood as representing a rational subdivision or subgrouping of the generalized content represented by the top level category header A.

Likewise, each of these first "sub-level nodes" might lead to a further set of rational subdivisions or subgrouping if, indeed, the content represented by each of the first sub-level nodes is still too generalized for comprehension. In the exemplary diagram of FIG. 5, the first sub-level node A2 represents an entry point to a set of additional (second) sub-level nodes denoted A21, A22 and A23 indicating that these nodes depend from the first sub-level node denoted A2. These second sub-level nodes might contain a body of content material but might also contain entry points to a set of third sub-level nodes which might be denoted A221, A222 or A223, if the entry point of the third sub-level were chosen from the node A22.

In summary, the overall structure is very much like that of a tree, in that a central trunk communicates with and branches into a relatively limited number of large limbs which, in turn, diverge into a number of individual branches. Content might be represented by leaves which populate the various branches (or even sub-branches if that is the case) and might even populate certain of the larger limbs of the tree-like structure. It should thus be understood that any object being sought by traversing a hierarchical structure may reside and be found at any one of the vertical nodes defining that structure and certainly need not all reside in an object pool underlying the ultimate, most fine-grained definitional nodes.

It should be understood that although the foregoing was described in connection with a particular travel path starting at a top level node A and traversing a nodal structure through the central node, real hierarchical structures are certainly neither so uniform nor so directed. There may be any number of nodes residing in any of the sub-levels, each of which might further branch into any number of additional lower level nodes. Once a particular starting point is chosen, the structure might be traversed in any direction, from node to node, that a user desires. Indeed, and in accordance with the invention, the structure may be entered non-hierarchically, so long as a definitional index for any sub-level node (i.e., A2134) is known to a user. The CCS categorizes the various content sites so as to allocate contained content to a respective, rationally related node, whether that node is top-level, first or second sub-level, or the like. A collaboration consortium determines the rational meaning of top-level nodes such as A, B and C, in order to differentiate the content collection that each top-level node represents.

Figure 6:
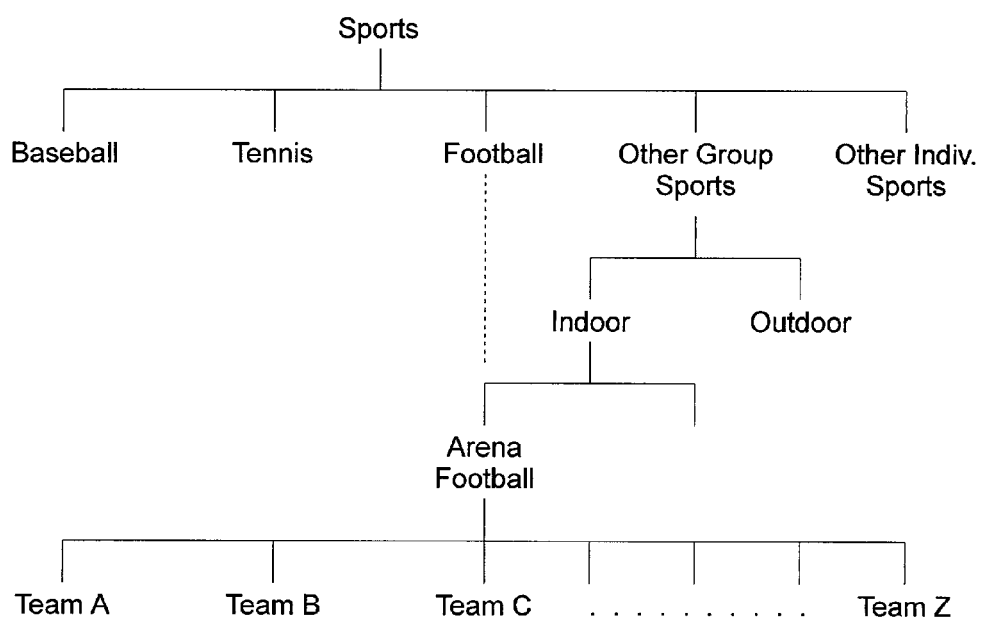
FIG. 6 is a semi-schematic, structure diagram of a hierarchical organization, conceptualized in FIG. 5, illustrating nodal divergence as applied to a particular topic.

By way of example, and in the exemplary diagram of FIG. 6, a collaboration consortium might be concerned with information relating to sporting events. According, a top-level category denoted "spots" is allocated to a collaboration consortium concerned with that collection of content. Various members within the consortium might be concerned with various aspects of sporting events, such as baseball, tennis, football other group sports or other individual sports and their sub-level nodes are denoted accordingly. Choosing to traverse the indoor sports node, a user might eventually traverse an "arena football" node to a set of perhaps individual arena football team nodes, such as team A, B, C . . . Z. The user is then able to select the team of interest and be presented with a collection of content relating particularly to that team. Research into content relating to arena football team C, for example, may now be performed on a more rationally related content base, thereby minimizing the time, effort and frustration that a user conventionally encounters in dealing with the information "furball" which now characterizes the World Wide Web.

Although the foregoing has been presenting in terms of traversing a global object directory relating to the World Wide Web, it should be understood that the same conceptual comparatives are directly applicable to accessing an information repository established by a consortium of content source providers, that agree to share information between and among one another. However, although the information is categorized and organized for ease of access and presentation, without the CCS, there would be no strict rules guiding the control software at each content site to access, collect and interchange collaborative information with other, related content sites. In order to prevent ad hoc information exchange protocols, the CCS defines the valid format for querying a content site for web page that contains certain information.

Accordingly, it should be understood that the CCS not only defines the hierarchical categorical structure of the information repository, but also defines the means by which information with the categorical structure may be accessed. Each of the nodal definitions contains its CCS identifiers, along with the valid querying format for that node. In summary, the CCS may be viewed as a mechanism which provides a relational view to an otherwise non-structured collection of web pages. By way of contrast, the RFI of protocol itself does not specify how application software should implement a query engine in order to fetch web pages that match an RFI query.

Specifically, the CCS defines a categorical hierarchy of websites and structures for each category, where each structure encapsulates fields of information that can be gathered within any one particular web page. For example, a web page about a compact disk will normally contain information relating to the performing artist or group, the name identifying the compact disk and perhaps information relating to the compact disk publisher. The structures within the CSS are able to contain all possible pieces of information that might be captured within any one particular web page, but not all fields are required to be implemented at all content provider sites.

In the exemplary embodiment of FIG. 1, an exemplary CCS categorical structure contains category tags (CAT) which identify the particular category being described. In accordance with a rational hierarchy, category tags might include various subcategory definitions, each of which might be considered a finer-grained representation or specialization of the parent category. In the exemplary embodiment of FIG. 1, the top level category <CAT name="ccs" id =0>indicates the name of the top-level category with which that particular structure is associated. In FIG. 1, the category name is denoted as "ccs" with an identifier of 0, indicating it as a top level category, where "ccs" might represent the fact that this is a CCS structural implementation and not an RFI structure. Flowing down through the category tree in FIG. 1, sublevel categories might include "arts", "business", "recreation", "shopping", or the like, with various further subcategories such as "music", "entertainment", and the like, subtending from the first sub-level categories.

It should be noted that the exemplary embodiment of FIG. 1 implements a categorical hierarchy using terms borrowed from the Open Directory Project. It will be understood that the actual identifier of a category, or subcategory, might be determined by the consortium members which are responsible for content contained within a category or sub-category.

Thus, the CAT tags identify the category being described. A structure tag (STR) identifies the structure being looked for for RFI queries against any URL listed in that category or subcategory. The structure contained within an STR tag identifies the valid fields that a content provider, implementing this category of information, may query against. According, one may query a content provider implementing this category, in order to provide web pages that contain a certain value for a field listed in the STR tag. For example, and according to the exemplary embodiment of FIG. 1, a first STR tag, implemented within the category "concerts", denotes fields for "performer" and "location". Accordingly, a content provider implementing information relating to "concerts" will provide web pages in response to a query, that contain concert information relating to the values entered for the "performer" and "location" fields.

Similarly, the STR tag associated to the category "recordings" allows field entries for "artist", "album", and "publisher". As discussed above, not all fields need to be populated with entered values. Rather, if a field is not populated it defaults to a null value which indicates that the corresponding field should be treated as a "wildcard".

Additionally, and in accordance with the invention, IMP tags enumerate all of the content sites which are members of a collaboration consortium which implements that particular category of sub-category beneath which the IMP tags are appended. For example, www.ticketmaster.com and www.concerts.com are members of a collaboration consortium which implements the sub-category "concerts" and upon whose sites queries relating to "performers" and "locations" will be executed. Accordingly, the CCS can be understood as providing a mechanism to identify content sites that implement certain categories of information, i.e., content sites that include at least one content page which contains information within the subtended category, along with fields that the site may be queried against.

In the exemplary CCS embodiment of FIG. 1, it will be understood that a user is able to query Amazon.com for web page content that indicates a certain value for an "artist" field. Thus, it is possible to query Amazon.com for web pages relating to "Pink Floyd" as artist. It should be noted, however, that there may be many pages on Amazon.com with an artist field. In order to avoid confusion between two different category web pages at a particular content provider site, that might contain the same field name, the RFI protocol identifies a particular category when executing an RFI query. The syntax for the RFI query protocol might be understood as comprising a subset of the SQL. In general, an RFI query is issued in the form; *[host:category] where [condition]. As will be understood by those having skill in the art, the RFI specification only allows for a "*" following a select command and the "where" clause is mandatory. Given any one particular CCS, there will necessarily be only a finite number of valid RFI query combinations. Content providers operating within a particular CCS consortium will only honor RFI queries that do not violate the CCS. Otherwise, results are arbitrarily denoted as "undefined". For example, and in accordance with the exemplary CCS of FIG. 1, a valid RFI query for concert information relating to "Pink Floyd" might be expressed as: select * from ticketmaster.com: arts.music.concerts where artist ="Pink Floyd".

In this particular, ticketmaster.com is the host from which information is to be selected, and the category is represented by the string arts.music.concerts. The mandatory where clause indicates the contents of the artist field, where the artist is Pink Floyd.

The RFI result set is always expressed in XML and adheres to the RFI DTD when defining the XML format of the results. In particular, and in accordance with the exemplary embodiment of an RFI results DTD, FIG. 3, the form and format of the DTD (Document Type Definition) defines the RFI results document structure including a list of legal document elements. Additionally, the exemplary embodiment of FIG. 4, depicts an example of an RFI result set for the RFI query discussed above.

In general, the results for any particular RFI query will contain zero or more results, unless an error occurs such as the execution of an invalid query or a query that violates the CCS. Results are always enclosed within a RESULT tag, with each result given a unique result ID, beginning with an integer indicia 1. Each result must contain values for all fields of the RFI structure within that particular category. If a content provider does not implement all of the fields within a particular category, the value for the unprovided field must be left empty, as exemplified by <FIELD name="XYZ"></FIELD>, where XYZ is a non-implemented field at a particular content provider. Further, each result set must include a RESULT tag, which may or may not list a URL attribute. If a URL attribute is specified, i.e., <RESULT url=http://www.ticketmaster.com/aaabbbccc/> it must necessarily correspond to a hyperlink to the results of the query.

Many content sites generate content dynamically, and the dynamically generated content is valid only for the duration of a particular Hyper Text Transfer Protocol (HTTP) session. Dynamic content generation details are conventionally outside the scope of the RFI protocol specification. However, and in accordance with the invention, the RFI protocol according to the system keeps an HTTP session open to the actual dynamically generated content, and provides a unique proxy Uniform Resource Located (URL) for the query results. When a user "clicks" on the unique proxy URL, the RFI implementation software funnels the captured HTTP traffic through the active HTTP session.

Further, the system is able to support content collection from a number of simultaneous RFI queries. In this regard, it is often convenient to execute complex RFI queries that range over several different content providers. For example, it may be desirable that query results are filtered through a user's possessive preferences scripts prior to the time they are displayed to the user. In a manner similar to SQL support of multiple relational tables in the "from" clause, RFI queries support multiple listing of multiple content providers in the "from" clause (select * from . . . ). Additionally, results reflect the logic specified in the "where" clause over the resulting multiple results sets.

By way of example, the following SQL query is a modification of the "select" statement discussed above, where results are requested from ticketmaster.com regarding concerts by a particular artist, but which now require filtering based on a user's desire to location preferences. Such a query would be set forth as follows:

select * from ticketmaster.com:arts.music.concerts, preferences.com:arts.music.concerts where (ticketmaster.com: arts.music.concerts.artist="x") and (preferences.com: arts.music.concerts.user_id="user") and "preferences.com: arts.music.concerts.location=ticketmaster.com:arts.music.concerts.location)

The above described RFI query causes two parallel queries to be executed; a first at ticketmaster.com and a second at preferences.com. Results are then filtered at the querying host for those result sets that match the concatenated "where" clause. This is simply accomplished by providing the querying host which implements the RFI protocol with a conventional RFI query engine.

As will be understood by those having skill in the art, content in a specific category, at two different content provider sites, may have the same conceptual meaning, but may be spelled, identified or represented by different terminology. For example, a category in the CCS which describes types of restaurants might imply an RFI structure for such a category to include identifying fields such as NAME, i.e., the name of a restaurant, LOCATION, i.e., where the restaurant is physically located, TYPE, i.e., the type of cuisine served, and PAYMENT, i.e., the type of payment accepted. When considering the field element PAYMENT, it will be recognized that different content providers might choose different methodologies in representing this particular field. One particular content source may use the value "credit cards" and another content source may use the value "all payment types are accepted" as fulfillment values for the PAYMENT field. From a collaboration point of view, both values represent substantially the same meaning. As a further elaboration example, a particular content source might be represented by restaurants.com (which lists all restaurants in all cities) and a second content source might be represented by preferences.com (which contains all preferences for all users). A user who only prefers to pay by credit card and a restaurant that accepts all payment options would necessarily comprise a valid match, as far as content collaboration is concerned.

However, the difficult lies in the fact that it is difficult to represent such arbitrary matches in an SQL-type language. The RFI query language extends SQL by treating the "like" clause in a different fashion. Each CCS category lists a set or lexicon of terms for each category along with a constructed set of accepted synonyms for each term in the lexicon. Synonyms are intended to be category specific and indeed, need not be present. In the case where synonyms are identified, synonyms for each category are listed in a SYN tag, with a first attribute specifying a term and a second attribute specifying a list of synonyms identified to that term. When the RFI query engine executes a "like" clause in the "where" predicate, it uses the category specific synonym table to further assist with data item matching.

An exemplar of a query including a "like" clause might read as follows:
select * from ticketmaster.com:arts.music.concerts, preferences.com:arts.music.concerts where (ticketmaster.com: arts.music.concerts.artist like "x" and "preferences.com: arts.music.concerts.user_id="user") and (preferences.com:arts.music.concerts.location like ticketmaster.com:arts.music.concerts.location).

In the first occurrence of the "like" clause, synonyms are not affirmatively used, since the number of musical artists is quite large, and it is possible to find matching data criteria by just following a straight SQL "like" clause semantic structure. However, in the second instance of the "like" clause, the preferences.com table may list the value of the "location" field as "anywhere", whereas the location field in the ticketmaster.com table might be a specific value such as "San Jose". Since these two forms are formed of different characters, a conventional SQL "like" clause semantic structure breaks the collaboration. Since the IFI query protocol supports a synonym table, it is convenient to add a synonym in this situation in order to state that the word "anywhere" matches any string value.

It should further be understood that the content provider implementing the RFI query interface must provide a "listener" application for incoming RFI configured queries. The host-to-host protocol is an application layer protocol and may be suitably implemented using TCP/IP. The querying process connects to the remote query daemon, at a pre-specified port and initiates the RFI query followed by a conformance indicia "\n\n". In response, the RFI daemon responds with a result set in the RFI result syntax discussed above. The connection is held open indefinitely until either the querying host (the client) or the queried host (server) decides to drop the connection. If the connection is held open, additional RFI queries may be transmitted over the same open connection. Subsequent RFI queries are treated as non-related queries and each are processed on their own terms. Query transmissions are encoded in ASCII form and the connection is established over secured encrypted sockets. In this regard, a querying host implements a URL that might be structured in accordance with the following syntax:
rfi://www.host.com/q=(select * from [category] where [condition]).

Figure 7:
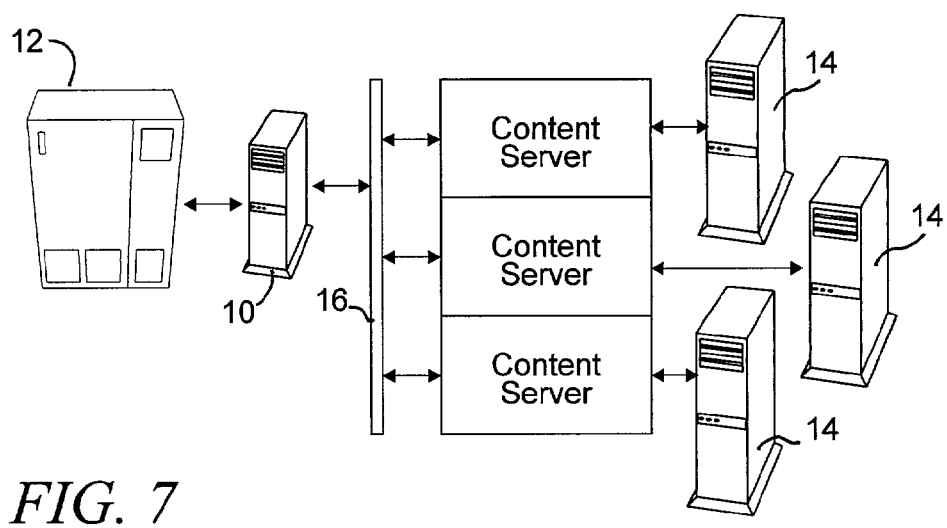
FIG. 7 is a simplified semi-schematic diagram of a system implementation of a server appliance according to the invention.

The methodology described above is hosted on a novel server type appliance, generally indicated at 10 in the exemplary embodiment of FIG. 7, and is provided to content supplier who installed the server appliance 10 in their net farm, allowing it to co-function with their existing web switches 12 and web servers, indicated generally at 14. The server appliance 10 is coupled between a router 12, for example, and a web farm 14 by means of a communication bus 16 over which the requisite traffic is directed. The exemplary server appliance 10 operates as a reverse proxy, terminating an HTTP connection initiated by an outside client, for example, and opens new session to the actual web server requested. The result of using the server appliance 10 as a reverse proxy, is primarily to enhance content supported by the actual backend web server 14.

The server appliance software, operates an HTTP daemon process, operating as a reverse proxy. The server appliance is able to operate in two modes; an inline mode, in which it essentially masquerades as a gateway to the web server and masquerades as the web server to the gateway, thereby intercepting all HTTP traffic, and in a network assist mode, where the server appliance operates in conjunction with web switching and HTTP forwarding agents. When operating in the inline mode, the server appliance is capable of acting as a DHCP master for those network configurations that do not support static IP addresses. Whether operating as a DHCP master, or as an inline masquerade, there is no need for any configuration chances to be made to the actual backend servers 14 of the content providers network.

Specifically, the server appliance platform 10 suitably comprised as a dual Pentium III platform with a minimum of two Gb of RAM. The system further comprises an SCSI disk, used for booting the daemon and loading the system's configuration files. The platform further supports Megabit Ethernet cards, such as the three COM:EtherLink III/XL/16, or Allied Telesis AT 150 or ATI 1700, or equivalence. The platform further supports Gigabit Ethernet cards, as well as the aforementioned SCIS cards. The platform deploys the latest stable lineups Linux Colonel Version 2.4 series which includes Pentium III specific enhancements to operations such as page copy and page zero. The Colonel further includes a patch to support SSE instructions and to allow user daemons to use SSE instructions.

In terms of connection management, the server appliance 10 incorporates a connection manager responsible for handling HTTP proxy connections between Gateway or web switch and the actual web server. Suitably, the connection manager creates as many HTTP proxy daemons as there are processors on the system. Accordingly, a Marlin-Spike platform will be able to support two active HTTP daemons. The connection manager in turn invokes the above-described content enhancement process, including execution of filters and converting extracted content to the specified output format.

As mentioned above, content collaboration is accomplished by means of an RFI query language (RQL) as described above. To support RQL queries, the server appliance 10 incorporates and RQL engine which, at minimum, supports RQL queries where an external content provider specifically requests related content that might be hosted on the server farm coupled to the particular server appliance 10. The appliance 10 further supports XML Version 1.0, the Document Object Model (DOM) level 1 specification, Wireless Application Protocol (WAP) Version 1.0 and the HTML 3.2 and WML specifications.

In addition to its platform configuration, the server appliance 10 hosts software application tools which allow a content provider to configure the various collaboration within which they wish to participate. Collaboration configuration is performed by way of a 5-step process, including categorical selection, category-to-site mapping, site-to-category mapping, collaboration, and finally network configuration. The collaboration configuration process is captured in a simple interface that walks the user through the configurations necessary to enable their websites for content collaboration, in accordance with the invention. The interface application serves as a guide through the process and allows the user to reference a tutorial at any stage in the process. The tutorial functions as an end-two-end walk through of a sample content provider becoming consortium enabled.

Figure 8:
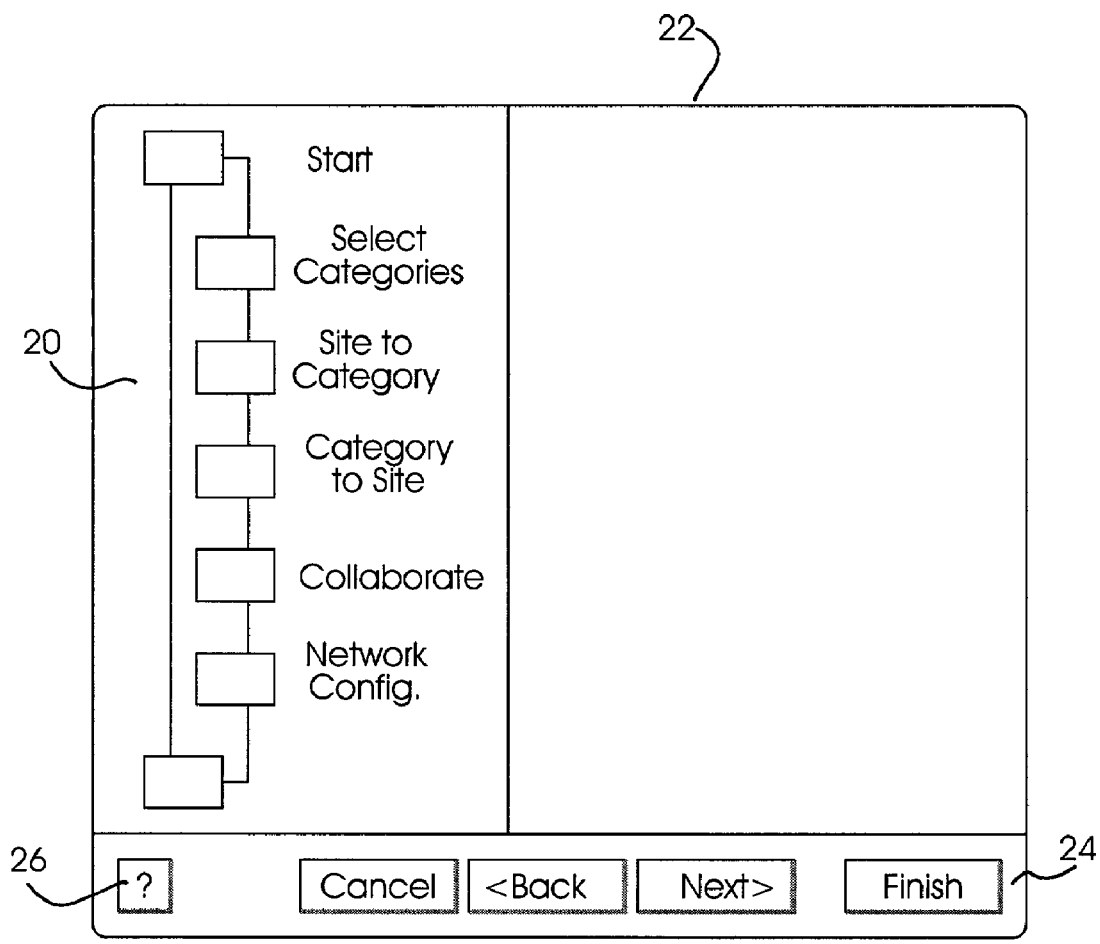
FIG. 8 is exemplary screen shot depicting an initial GUI interface screen of a consortium wizard software program, including process step navigation.

The interface application software routine, termed herein a consortium wizard, is presented to the user over a graphical user interface (GUI) such as illustrated in the exemplary screen shot of FIG. 8. The initial screen depicts all of the elements of the process flow, as well as indicating the position of user within the flow progress. The process steps are depicted as the boxes comprising a flow diagram 20 represented in a corresponding portion of the interface screen 22. As each stage of the process is completed, the corresponding box is checked, turns color, or otherwise provides a visual indication that that portion of the process flow is completed.

Suitably, the interface screen 22 includes a set of conventional navigation buttons 24 which allowed a user to move forward and backward through the interface, while also providing the user with helpful tips and access to the tutorial through a help button 26.

As each portion of the process is selected, a corresponding screen appears through which the user is able to navigate in order to perform the functions relating to the completion of that process step. In particular, accessing the category selection step invokes a category selection window, such as depicted in the exemplary screen shot of FIG. 9, which the user is now free navigate. Selecting categories involve classification of the content of the content provider's online presence. The category selection screen 28 provides the user with a graphical representation of the Content Category Structure (CCS) which provides a broad array of categories fitting most websites, as has been described in detail above. The graphical representation of the CCS 30 arranges the various categories in ascending or descending alphabetical order and denotes each category with a folder "icon" which may be further "clicked" in order to access any sub-levels or fields within a CCS category. Fields within categories are potential collaborative pivot points that are able to exist in a web page classified in that specific category. To deal with the potentially large size of the complete CCS, the user is able to query the CCS by a category name, field name, and by content provider description.

By either browsing or querying the CCS, content providers are able to select any number of categories that they wish to be classified within. After a category selected, the content provider is given a choice as to whether they wish to add any additional fields to their entry in the CCS. Categories can be selected either by querying the CCS tree for fields or categories by name or by affirmatively browsing the CCS.

Figure 9:
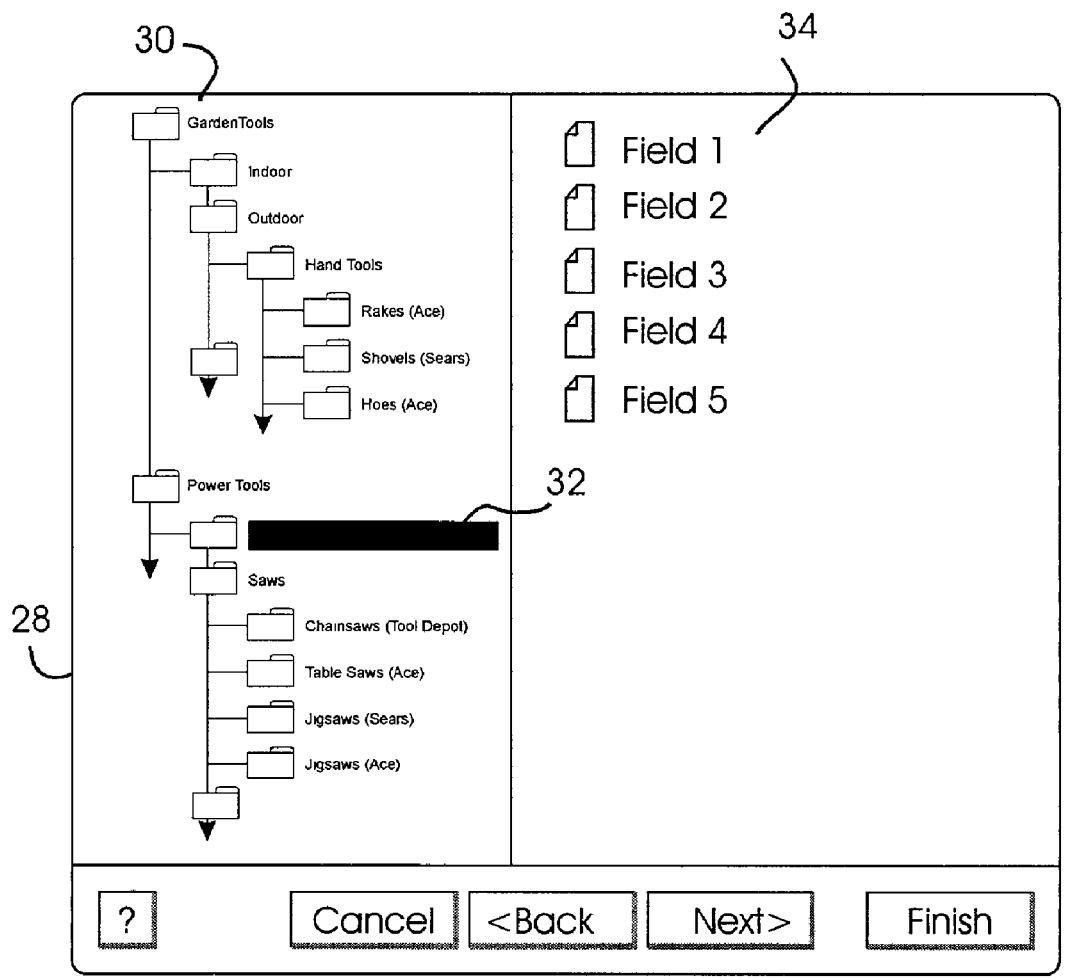
FIG. 9 is exemplary screen shot depicting an additional GUI interface screen of a consortium wizard software program, including CCS category definitions and schema fields.

As depicted in the exemplary embodiment of FIG. 9, users are able to edit and create CCS categories and add fields to each category, thereby creating a CCS category schema. In FIG. 9, the user has selected a CCS category termed "music" 32, and a suitable portion 34 of the category selection screen 28 depicts the schema fields for the selected category (music). Suitably, the schema fields for the selected category comprise the fields "album", "awards", "concerts", "label", and "musician". Once a CCS category schema is created, the fields will be mapped to actual HTML nodes in the content provider's web page, such that a content to CCS schema mapping is established.

Content extraction involves the generation of rules for the server appliance to use when parsing a particular website for collaborative content. Depending on the date, context, user, and navigation path used to access a website, the content of a website changes. However, the layout of each page remains substantially constant, regardless of the access parameters. The consortium wizard application program allows the content provider to browse their own site and select the content to collaborate. The category to CCS mapping step specifies how the server appliance identifies collaborative content from an active HTML stream, while the category-to-content mapping specifies how a particular content provider will service a foreign appliances' request for collaborative content. The category-to-site and site-to-category mapping steps define guidelines, or rules, for interaction with specified content on the website.

Figure 10:
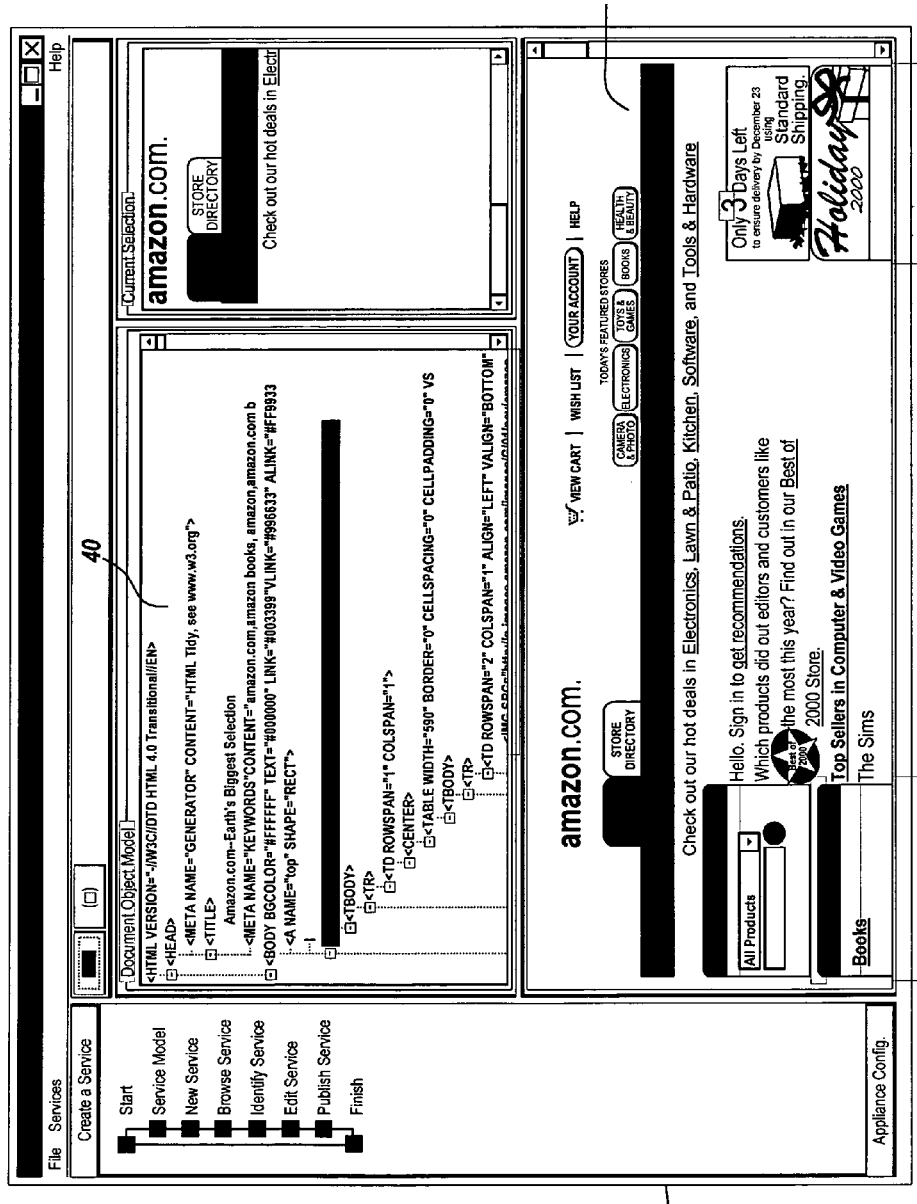
FIG. 10 is exemplary screen shot depicting a site/category mapping GUI interface screen of a consortium wizard software program according to the invention.

Turning now to the exemplary screen shot of FIG. 10, there is depicted a screen 36 that would be presented to a user upon access of the category-to-site or site-to-category mapping steps from the initial consortium wizard process screen of FIG. 8. Simply put, the GUY screen 36 of FIG. 10 is graphical display of the content provider's website depicted in one portion of the screen, along with the actual DOM tree hierarchy of the site's markup language (XML, HTML, and/or WML) in an adjacent portion 40 of the screen 36. The user simply selects the content to collaborate on by "clicking" or otherwise selecting the DOM representation, and what CCS categories and fields the content is to be associated with (selected from the classification step).

Thus, the category-to-site and site-to-category mapping steps can be understood as comprising mirror images of one another with only a simple ordering process differentiating between the two.

Turning now to the collaboration step, this is where the content provider specifies how the server appliance 10 is to collaborate with other content providers that have access to their own server appliances and are listed in the CCS. The collaboration step is where the content provider identifies collaborations and rules for merging-in (fusing) related content from other content providers into query results provided to a user. The consortium wizard provides the content provider with a directory of consortium members, as well as a query engine for identifying potentially unlisted members. Briefly, the query engine functions to poll the worldwide web provide a return for any "pings" that identify CCS enabled installations that are not identified on the system's own hosted CCS list. In performing the "ping", the query engine also requests and forwards a copy of the other system's CCS listing, along with its mapping criteria and collaboration rules. These elements are then incorporated into the "pinging" server CCS documentation set.

In this regard, the consortium wizard is able to provide a content provider with a browsable CCS structure where the members of each category in the CCS are displayed as associated to that category. When members are selected, and appropriate GUY screen is displayed that shows a listing of the members, with each member listing indicating the fields that they are able to collaborate. One of the particular advantageous features of the invention is that the categories need not be the same for all consortium members, since the consortium wizard will allow its user to specify fields of each content provider are to contain selected values during the collaboration process. The step is substantially similar to the step of creating an SQL query using a forth generation language.

When an association has been made, the content provider has created collaboration. An RFI query (RQL statement) is generated based on the user's action in making the association. These queries are triggered each time the server appliance acquired a web page that matches the description that the user specified in the content to CCS mapping steps. It is this RQL statement that defines when and with whom the server appliance with collaborate.

The final step in the process is the simplest and relates to specification of the network parameters that the server appliance needs to enable to site to enable the system of the invention. Network parameters specified include designation of the mode in which the appliance operates (inline or network assist), a gateway designator, such as IP address, a network designator, such as network mask, a subnet mask and a broadcast mask.

To recapitulate, the host platform (server appliance) is physically disposed between a web content server and a content provider's native gateway. The system utilizes the proxy ARP to appear as the web server to the gateway and as the gateway to the web server. This operation is completed seamless and requires no further administrative or software changes to the either the gateway or the web server. If the web server is configured to use DHCP, the server appliance issues a separate IP address instead of using proxy ARP. In either event, if the web server has a static IP address, this will not need to be changed when the server appliance is inserted between the web server and the gateway. Physically, the only change needed is that the web server communication link plugs into one of the Network Interface Cards (NIC) on the server appliance rather than the internal LAN, and an additional NIC card in the appliance is plugged into to the LAN, thereby connecting the appliance to the gateway. Network parameters, such as gateway IP addresses, network masks and sub-net information can be configured on the appliance during installation, and is an operation well understood by those having skill in the art. This particular configuration, termed inline mode, is depicted in the semi-schematic simplified block diagram of FIG. 11, wherein the server appliance 50 is disposed between the web content server of 52, in turn coupled to a content data base 54. The server appliance 50 is coupled between the content server 52 and the LAN 56, where the gateway 58 and optional load-balancing web switches 60 remain unchanged in configuration and topology.

Figure 11:
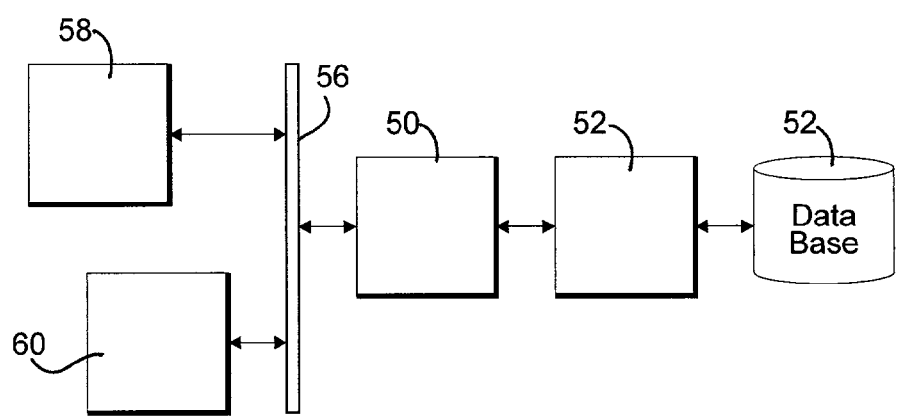
FIG. 11 is a simplified semi-schematic block diagram of a system implemented in an inline configuration.
Figure 12:
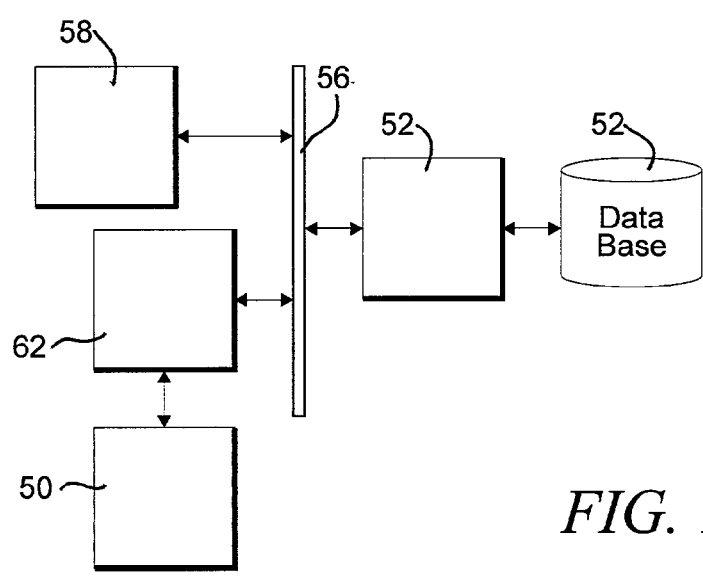
FIG. 12 is a simplified semi-schematic block diagram of a system implemented in an network assist configuration.

A second configuration, the assist mode, is depicted in the semi-schematic simplified block diagram of FIG. 12, wherein the server appliance 50 is coupled to a network management agent, such as a gateway, router or web switch, identified in the exemplary embodiment of FIG. 11 as 62. The network management agent 62 is coupled to the LAN 56 and through the LAN to the web content server 52. The agent 62 is configured to redirect every HTTP received over the LAN 56 to the server appliance 50 which, in turn, relays the request to the web content server 52 through the web switch. The server appliance 50 terminates the original HTTP connection and opens a new session to the web content server 52 acting as a proxy. The most common deployments of a server appliance in the assist mode of FIG. 12, include deployments at content provider sites which are implemented with network management agents such as web switches, at Point of Presence (POP) sites, such as WAP gateways, at content hosing sites or content cashing sites.

The primary difference between the two configurations is that of how the original HTTP request is intercepted. In both cases, the client HTTP session is terminated at the server appliance and a new session opened to the web server. In both configurations, changes to the HTTP request and HTTP replies are made dynamically using locally available XML configuration rules. Notably, when the server appliance is used in an assist mode, one appliance host is able to service multiple web servers simultaneously. Conversely, in the inline mode, one appliance host per web server is required for multiple web server applications. A choice between deployment modes can be made by network management personnel based on network throughput demands.

Figure 13:
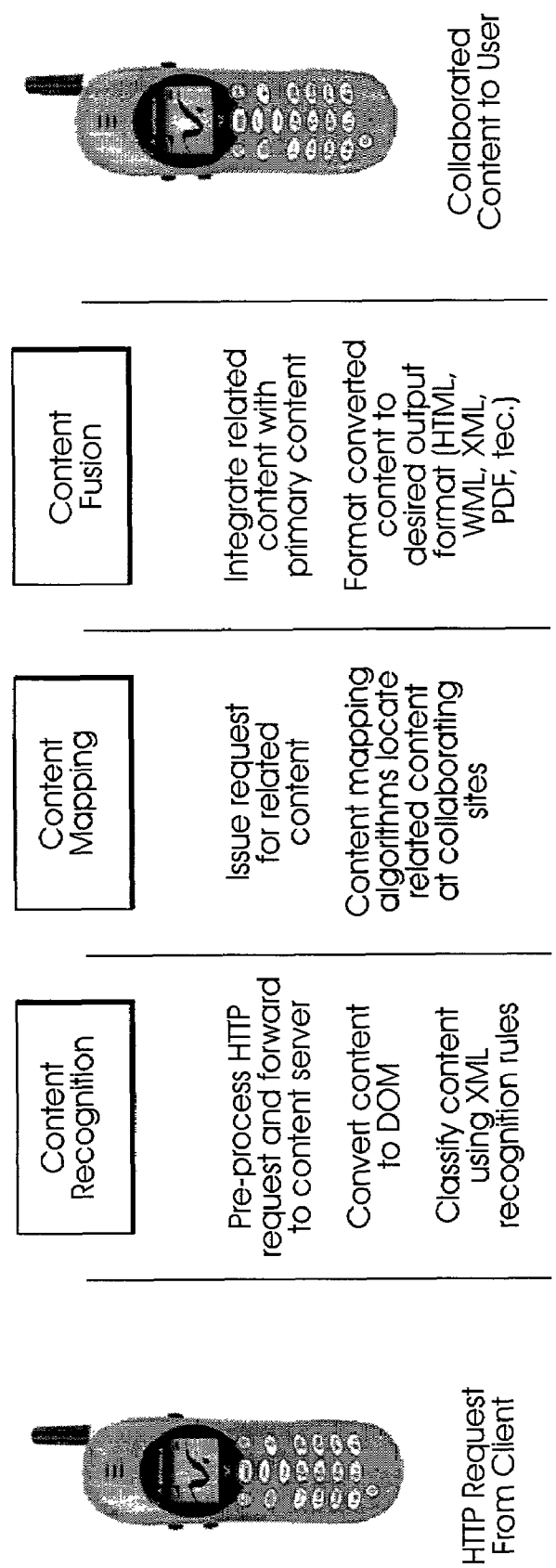
FIG. 13 is a simplified representation of a content recognition, mapping and fusion process according to the invention.

In operation and in accordance with the process depicted in FIG. 13, the server appliance daemons process and operate on content internally completely utilizing the DOM level 1 specification. Content recognition, RQL query creation and content fusion occurs completely at the DOM level. The system exposes a DOM level 1 API to identify, extract information from and manipulate the content before converting it to an output format. In particular, the daemon follows a multi-process for every HTTP request it services. In particular, the daemon allocates resources for each HTTP request and pre-processes the HTTP request before forwarding the request to the web server. Content extracted from the web server is converted to DOM and web pages are recognized using the configuration rules described above. RFI packets are formed and RFI responses are obtained from other remote appliance hosts. Next, content is converted from DOM to an output format, such as HTML, WML, HML, or PDF and an HTTP response is forwarded to the client.

Further, depending on whether the platform is deployed in inline or network assist mode, certain configuration parameters are required. For example, when the platform is used in inline mode, the platform needs to know the IP address of the web server the platform is masquerading as (if indeed the web server uses a static IP address). If the web server uses DHCP, this value may be omitted, since the platform incorporates a DHCP agent. If the platform utilizes network assist mode, it still requires some knowledge of the IP address of the gateway. The main difference is that the platform relies on the network management agent (such as a web switch) to redirect HTTP requests to the platform. The network management agent treats the platform as it would treat a proxy server, assuming the that the platform will take over the HTTP request.

To summarize content extraction, a content provider is able to view their HTML content as a DOM tree, and visually choose particular nodes in the tree that contain the information to be used in the collaboration. Using the visual configuration interface (the consortium wizard), the content provider is able to program the server appliance to recognize and HTML stream as following under one or more CCS categories and, further, is able to provide logic for extracting values of the included fields of that category. For example, a web page from Amazon.com selling a music CD, contains artists and album information. The server appliance needs to understand where on such HTML page this information may be found, so that it can fill in the values for the music category in the CCS. As described above, through use of the consortium wizard, the content provider "points" at a tag and tells the system where to pick such information from. Through this process of "programming by example," the system is able to identify the artist and album information automatically the next time around.

With regard to content access, the server appliance is responsible for generating RQL results in response to RQL queries. And, RQL query indicates that the requestor's category, supplying values for the fields of the RFI structure within category. The query also identifies the CCS category for which the external host is to generate an RFI reply. In order to generate a satisfactory RQL result, the appliance host at the external site needs to know how to access local content in this category. Such rules are implemented as simply URL creation rules, CGI commands or a sequence of HTTP commands.

Collaboration also occurs in terms of the RFI query language, which contains SQL-like statements (termed RQL statements). Since the appliance is able to view each content provider as a relational data base, these statements allow for users to specify how to merge content from a number of different content providers. The RQL statements need only reference CCS fields and select values for those fields from the nodes of the DOM tree constructed at parse time. The collaboration wizard allows the user to select the different content providers from each content provider's CCS and instruct the consortium wizard to create a collaboration involving these content providers, in a manner described above. Since the wizard tool has already captured the CCS for each content provider, it automates the creation of the RQL query statements, confirming the action with the user, thereby creating contact collaboration rules.

The system is particularly suited for providing automated transaction execution within a web application on behalf of a user, allowing a user to resume the execution at a later time is the invention described in this document. When a user is required to perform a series of transactions on a web application, the execution of those steps is made on behalf of the user by a third party. The third party then relinquishes control of the initiated session to a user who is then able to complete the task. The third party is suitably implemented as an autonomous software program that has stored a set of tasks it can initiate, as well as an entry point into the session by way of a Proxy Uniform Resource Locator (URL). When a user accesses a Proxy URL, it is translated into an automated user session that has been initiated by request either by the user, or an agent of the user and the corresponding next step in the transaction series is executed and the response is then redirected to the user's browser rather than with the software that initiated the session.

Most browser based web applications are built upon Hyper Text Transfer Protocol (HTTP). It is a request/response protocol which implies that it is stateless in nature. The lifetime of a connection is the request and corresponding response. Web development is complicated by the stateless nature of HTTP because a user's session with a web application may involve a series of transactions. To make the application stateful across many transactions, special care must be taken by the application development team to solve this. This is done with a variety of techniques including but not limited to, cookies, hidden variables, and URL rewriting. Automated site navigation and session management goes beyond the problem of stateful web application, and provides a way for the user to bypass a series of transactions because the transactions have been executed before the user accesses the site. The user then may resume the session and continue using the web application.

While certain exemplary embodiments of the invention have been described in detail above, it should be recognized to other forms, alternatives, modifications, versions, and variations of the inventions are equally operative and would be apparent to those skilled in the art. The disclosure is not intended to limit the invention to any particular embodiment but is intended to embrace all such forms, alternatives, modifications, versions, and variations.

Accordingly, while this specification, for the sake of clarity and disclosure, at times use a specific terminology and constructs to refer to certain aspects of the invention and its operating environment, will be recognized that the invention set forth herein is applicable to other areas as well. For example, the specification frequently refers to the Internet, websites, web pages, and documents; it should be observed that the invention is equally applicable to other types of documents, data base and document collections. Moreover, references to preferences are not intended to be limited to any particular implementation (or set of implementations) but instead should be construed to apply to all means and methods for specifying and retaining such information.

Similarly, HTML is described as the most common format or language for describing documents on web; it should be noted that other document formats, such as XML, SMGL, plain ASCII text, plain Unicode text, and other standard or proprietary formats are also in use on the Internet and in various other document-based applications. The invention will function equally well in the context of networks utilizing other formats or even multiple formats. The purposes of certain aspects of the invention, the only limitation is that format be decomposable into a language. The term "document" is intended to refer to any machine or human readable data file (or collection of related files) from which information can be retrieved.

URLs are typically used to access information on the Internet and frequently on other networks as well. However, it should be recognized that other means of specifying the location, identity and nature of a requested document are also possible, with such alternative schemes readily apparent to a practitioner of ordinary skill in the art.

Accordingly, the invention is not to be limited to the specific embodiment described herein, but rather to all other embodiments, implementations, and methodologies that fall within the scope of the appended claims.

What is claimed is:

1. A system for collaborative exchange of Web based content information between and among disparate and unrelated content sources, the system comprising:
   at least a web content server, disposed at a facility, the facility belonging to a particular content provider, the provider providing content through the web server;
   a server appliance, electronically disposed between the web server and a wide area communication network, the server appliance terminating a HTTP session directed to the web server and initiating a HTTP session with the web server as a substitute; and a content collaboration engine, the engine hosted on the server appliance, the content collaboration engine further comprising;

a content recognition engine, the recognition engine receiving content from the web server in response to the HTTP session initiated by the appliance, the recognition engine converting received content to DOM, the recognition engine further classifying content in accordance with XML recognition rules; and a content mapping engine, the mapping engine extracting content definition fields from classified content and requesting, via a request for information protocol comprising a content category structure definition, related content from a consortium of collaborating sites, the content category structure definition having a format for categorizing content, the requested content having content definition fields including values substantially the same as the extracted content definition fields.

2. The system according to claim 1, further comprising a content fusion engine, the fusion engine integrating related content received from collaborating sites with classified content, the fusion engine converting the fused content to a desired output format.

3. The system according to claim 2, wherein the desired output format is selected from a group consisting of HTML, WML, XML, and PDF.

4. The system according to claim 2, further comprising:
a network gateway; and
wherein the server appliance is interposed between the gateway and the content server, the server appliance configured to appear as the gateway to the content server and as the content server to the gateway.

5. The system according to claim 2, further comprising:
a network gateway; a network management agent; and
wherein the server appliance is coupled to the network management agent, the agent configured to redirect HTTP requests made to the content server to the server appliance.

6. The system according to claim 1, wherein the request for information protocol comprises a format for defining a structure that identifies valid content fields a content provider can be queried against in order to identify and recover content from a specific category categorized by the content category structure definition.

7. The system according to claim 6, wherein the request for information protocol further comprises means for requesting collaborative information from third party content sources.

8. In a system for exchanging Web based content information between and among disparate and unrelated content sources, a method for collaborative exchange of related content, the method comprising:
providing content through at least a web server, disposed at a facility, the facility belonging to a particular content provider;
electronically disposing a server appliance between the web server and a wide area communication network, the appliance terminating a HTTP session directed to the web server and initiating a HTTP session with the web server as a substitute; and
receiving content from the web server in response to the HTTP session initiated by the server appliance;
converting received content to DOM;
classifying content in accordance with XML recognition rules;
extracting content definition fields from classified content; and
requesting related content from a consortium of collaborating sites via a request for information protocol comprising a content category structure having a format for categorizing content.

9. The method according to claim 8, further comprising:
the requested content having content definition fields including values substantially
the same as the extracted content definition fields; and
integrating related content received from collaborating sites with classified content.

10. The method according to claim 9, further comprising the step of converting the fused content to a desired output format.

11. The method according to claim 10, wherein the desired output format is selected from a group consisting of HTML, WML, XML, and PDF.

12. The method according to claim 8, wherein the request for information protocol comprises a format for defining a structure that identifies valid content fields a content provider can be queried against in order to identify and recover content from a specific category categorized by the content category structure definition.

13. The method according to claim 12, wherein the request for information protocol further comprises means for requesting collaborative information from third party content sources.

14. In a system for exchanging web based content information between and among disparate and unrelated content sources including a web server, disposed at a facility belonging to a content provider, the content provider providing content through the web server, and a server appliance electronically disposed between the web server and a network, a method for collaborative exchange of related content, the method comprising:
terminating, by the server appliance, a HTTP session directed to the web server and initiating a HTTP session with the web server as a substitute;
receiving, by the server appliance, content from the web server in response to the HTTP session initiated by the server appliance, converting received content to DOM and classifying content in accordance with XML recognition rules;
establishing, via the server appliance, a consortium of content sources;
defining, via the server appliance, a content category structure comprising a format for categorizing content from a consortium of content sources; and
establishing, via the server appliance, a request for information protocol comprising the content category structure to request from the consortium of content sources content related to content received by the server appliance.

15. The method according to claim 14, wherein the request for information protocol comprises a format for defining a structure that identifies valid content fields a content provider can be queried against in order to identify and recover content from a specific category categorized by the content category structure definition.

16. The method according to claim 15, wherein the request for information protocol further comprises means for requesting collaborative information from third party content sources.

17. The method according to claim 16, wherein the content category structure definition further comprises category tags, the category tags identifying a particular category according to a pre-defined name indicia.

18. The method according to claim 17, wherein the content category structure definition further comprises a structure tag, the structure tag identifying at least one structure field according to a pre-defined name indicia, the at least one structure field defining a valid field against which a content provider implementing a particular category may be queried against.

19. The method according to claim 18, wherein the content category structure definition further comprises synonym identification means for associating operative synonym terminology to a category name or structure field lexicography.

20. A system for collaborative exchange of Web based content information between and among disparate and unrelated content sources, the system comprising:

at least a web server, disposed at a facility, the facility belonging to a particular content provider, the provider providing content through the web server;

a server appliance, electronically disposed between the web server and a wide area communication network, the appliance terminating a HTTP session directed to the web server and initiating a HTTP session with the web server as a substitute, the server appliance constructed to receive content from the web server in response to the HTTP session initiated by the server appliance, convert content to DOM, and classify content in accordance with XML recognition rules and request content from a consortium of content sources via a request for information protocol comprising a content category structure the content category structure having a format for categorizing content sources;

a network client, the client operatively responsive to user input commands and coupled to communicate over the wide area communication network; and wherein the server appliance comprises means for executing a series of transactions with the web server on behalf of the user prior to the user accessing a session with the web server.

21. The system according to claim 20, further comprising a proxy URL providing an entry point to the session from which the user can continue the session at a point of completion of execution of the series of transactions.

* * * * *